United States Patent [19]

Jeris

[11] 4,009,099
[45] Feb. 22, 1977

[54] APPARATUS AND PROCESS FOR REMOVING AMMONIA NITROGEN FROM WASTE WATER

[75] Inventor: John S. Jeris, Yonkers, N.Y.

[73] Assignee: Ecolotrol, Inc., Bethpage, N.Y.

[22] Filed: Jan. 14, 1976

[21] Appl. No.: 648,895

Related U.S. Application Data

[63] Continuation of Ser. No. 487,972, July 12, 1974, abandoned, which is a continuation-in-part of Ser. No. 333,394, Feb. 16, 1973.

[52] U.S. Cl. .................................. 210/3; 210/17; 210/107; 210/151
[51] Int. Cl.² .......................................... C02C 1/04
[58] Field of Search ............... 210/3, 17, 20, 63 R, 210/107, 150, 151, 194, 196, 199, 4–8

[56] References Cited
UNITED STATES PATENTS

| | | | |
|---|---|---|---|
| 2,620,926 | 12/1952 | Helbig | 210/20 |
| 3,342,334 | 9/1967 | Soriente et al. | 210/108 |
| 3,374,052 | 3/1968 | Fan et al. | 210/20 |
| 3,442,802 | 5/1969 | Hamilton et al. | 210/63 R |
| 3,779,906 | 12/1973 | Levin | 210/17 |
| 3,846,289 | 11/1974 | Jeris et al. | 210/20 |
| 3,855,120 | 12/1974 | Garbo | 210/17 |

*Primary Examiner*—Thomas G. Wyse

[57] ABSTRACT

A biological process for removing ammonia nitrogen from waste water by forming a fluidized bed of microorganisms attached to a solid particulate carrier, continuously passing waste water to be treated through said fluidized bed, adding oxygen to said fluidized bed, retaining the waste water in the fluidized bed for a sufficient period of time while controlling other necessary parameters to biologically convert substantially all of the ammonia nitrogen to be removed from the waste water to oxidized forms of nitrogen, water and cellular material, and thence withdrawing the biologically converted products from the fluidized bed. In another form of the invention apparatus is provided for effecting the foregoing process.

23 Claims, 1 Drawing Figure

APPARATUS AND PROCESS FOR REMOVING AMMONIA NITROGEN FROM WASTE WATER

This is a continuation of Ser. No. 487,972, filed on July 12, 1974, now abandoned, which is a continuation-in-part of application Ser. No. 333,394 filed Feb. 16, 1973.

BACKGROUND OF THE INVENTION

The invention relates to apparatus and process for the biological treatment of liquid wastes employing fluidized beds. In particular, it is directed to a process for removing ammonia nitrogen from waste water.

Untreated municipal wastes generally contain from 20 to 50 milligrams of nitrogen per liter, mostly in the form of ammonia and organic nitrogen. The serious detrimental environmental effects of these compounds had not been fully realized until the last decade. With the large amounts of fixed nitrogen in the form of ammonia and other compounds that are being introduced into the biosphere by the large scale use of synthetic fertilizers, and with the demands man makes on his environment owing to population congestion, there definitely appears to be an imbalance developing in our ecological system that may have long range consequences for future generations. The presence of such nutrients in natural waters causes fertilization and vegetative growth in the form of algal blooms. Such blooms often result in accelerated eutrophication.

Conventional methods of municipal sewage treatment, chiefly activated sludge and trickling filtration are designed to remove solids and oxygen demanding organic material from the waste water. During these treatment processes some of the organic nitrogen is converted into the ammonia form. Chemical and physical methods such as chlorination and ion exchange have been tried in small scale experiments to remove these ammonia compounds from the waste water, but costs have been too prohibitive to attempt these methods of treatment in large scale installations. Although ammonia stripping is economically feasible, it suffers the disadvantages of poor operation or shutdown in winter and the introduction of ammonia into the atmosphere.

Biological methods of treatment have been most frequently used to remove ammonia in typical large installations. Oxidation of ammonia nitrogen to nitrate nitrogen can be accomplished in an activated sludge treatment plant by increasing aeration time in the plant from 3 – 6 hours to 10 or more hours. This requires the use of large aeration basins and is often inefficient because of difficulties in controlling the system. This oxidation of ammonia to nitrate, termed nitrification, can also be accomplished by aerating the effluent from the activated sludge treatment process in a separate aeration basin. This facilitates control of the nitrification process but requires additional aeration basins with an additional aeration time of 3 to 6 hours.

Certain experimental nitrification processes have employed the use of up-flow columns or beds. Such packed beds tend to become clogged as solids in the waste water are filtered out and further as attached biota undergo uncontrolled growth on the stone media. Such blockage causes insurmountable head losses. These losses must be relieved by frequent and impractical back washing of the bed. Also, detention times in excess of one hour are required.

An example of a prior art system is described in the publication by, St. Amant, P.P. and McCarty, P.L. "Treatment of High Nitrate Waters," JOURNAL OF AMERICAN WATER WORKS ASSOCIATION, pp. 659–669, 1969. This publication is concerned with an up-flow denitrification system, which is basically a packed bed of one inch stone, as compared to the present application which is concerned with a fluidized bed of small particles. Hence, the operating parameters and results are completely different. Another example of a prior art system is described in the publication by, Weber, W. J. Jr. and Morris, J. C. "Kinetics of Adsorption in Columns of Fluidized Media," JOURNAL OF AMERICAN WATER WORKS ASSOCIATION, pp. 425, 430, 443, 1965. This publication teaches the use of an expanded bed column for a physical adsorption process, i.e., the adsorption of organic carbon by porous adsorbent activated carbon particles. The process of Weber et al does not rely upon the use of biological action, as is the case in the present application.

Still another example of prior art systems is the Savage, U.S. Pat. No. 3,709,364 issued in January 1973. The process described in this patent is essentially a "deep bed filter" which employs a down-flow system. With this type of system, as the spaces between the particles become plugged with solid wastes, great head losses result. Savage recognized this problem and provided means for intermittent back-washing to agitate this filter media and remove suspended solids collected on it. Thus, the Savage system was predicated on different principles and employed different parameters as compared to the present application.

Other related patents and publications in this art include the following:

| United States Patents | | |
| --- | --- | --- |
| No. 2,676,919 | M. Pirnie | April, 1954 |
| No. Re 24,219 | M. Pirnie | September, 1956 |
| No. 2,834,466 | L. Hament | May, 1958 |
| No. 2,992,986 | W.T. Ingram | July, 1961 |
| No. 3,075,828 | Tsuneo Kato et al. | January, 1963 |
| No. 3,173,862 | J.S. Clements et al. | March, 1965 |
| No. 3,219,577 | T.J. Powers | November, 1965 |
| No. 3,424,674 | P.J. Webber | January, 1966 |
| No. 3,232,434 | W. Albersmeyer | February, 1966 |
| No. 3,371,033 | E.D. Simmons et al | February, 1968 |
| No. 3,401,113 | R.D. Pruessner et al | September, 1968 |
| No. 3,543,937 | J.M. Choun | December, 1970 |
| No. 3,547,816 | Horiguchi et al. | December, 1970 |

Publications

Weber, W. J., Jr., Hopkins, C. B. and Bloom, R. Jr., "Physiochemical Treatment of Waste Water," *Journal Water Pollution Control Federation*, Vol. 42, pp. 83-89, (1969).

Tamblyn, T. A. and Sword, Bryan R., "The Anaerobic Filter for the Denitrification of Agricultural Subsurface Drainage" Paper presented at 24th Annual Purdue Industrial Waste Conference, Lafayette, Indiana on May 7, 1969.

Beer, Carl, "Evaluation of Anaerobic Denitrification and Processes," Proc. Paper 7211, Seidel, D. F. and Crites, R. W., Ed., (April, 1970).

Castaldi, F. and Jeris, J. S., "Still Wanted: Economical Controlled Denitrification," *Water and Wastes Engineering Vol.* 41, 36–38, (June 1971).

Beer, C., Jeris, J. S. and Mueller, J. A. "Biological Denitrification of Effluents in a Fludiized Granular Bed, Phase I," prepared for New York State Department of Environment Conservation, published Mahattan College; (March 1972).

Weber, W. J. Jr., and Morris, J. C. "Kinetics of Adsorption in Columns of Fluidized Media," *Journal of American Water Works Association*, pp. 425,430, Vol. 443 (1965).

St. Amant, P. P. and McCarty, P. L., "Treatment of High Nitrate Waters," *Journal of American Water Works Association* pp. 659–662 (1969).

McCarty, Perry L. and Haug, Roger T., "Nitrification with submerged Filters," *Journal Water Pollution Control Federation*, Vol. 44, No. 11 (November 1972).

McCarty, Perry L. and Young, James C., "The Anaerobic Filter for Waste Treatment," *Journal Water Pollution Control Federation*, Vol. 41, R 160 (1969).

Weber, W. J., Jr., Friedman, L. D. and Bloom, R. Jr., "Biologically — Extended Physiochemical Treatment," Paper presented at 6th International Water Pollution Control Conference at the University of Michigan on June 22, 1972.

The last-mentioned article discloses an adsorption process and therefore a porous substrate is necessary, i.e. sand and the like material cannot be employed. There is no build-up of sludge disclosed and stoichiometric amounts of oxygen are not employed.

Accordingly, while the art has recognized the desirability of employing biological organisms to remove ammonia from waste water, it has not succeeded in providing an inexpensive and highly efficient process for rapidly treating large quantities of waste water. Accordingly, there exists a critical need for a process free of the defects and deficiencies of the prior art to purify waste water.

SUMMARY OF THE INVENTION

It is, therefore, a primary object of the invention to provide a relatively inexpensive process employing biological organisms for oxidizing the ammonia nitrogen content of waste waters to oxidized forms of nitrogen.

As employed in this application the term "waste water" or "liquid waste" includes organic or inorganic liquids or mixtures thereof containing biologically decomposable contaminants and containing the equivalent of at least about 10 milligrams per liter of nitrogen in a reduced form; particularly the ammonia form. Most municipal waste waters and industrial waste waters of equivalent strength fall within the above definition of waste water.

It is another object of the invention to reduce the ammonia nitrogen content of waste water employing a fluidized bed of biological organisms and simultaneously controlling the tendency of the bed particles to become excessively enlarged by excess biological growth.

It is an additional object to treat waste water containing significant amounts of suspended solids without effectively reducing the efficiency of the process.

A further object of the invention is to provide an efficient waste treatment process adapted to operate at lower detention times compared to traditional processes.

The aforementioned and other objects are met in a process for removing ammonia nitrogen from waste water by generating a fluidized bed from waste water and biota adapted to oxidize ammonia nitrogen by use of aerobic biota attached to a solid particulate carrier adapted to be fluidized; then metering sufficient amounts of oxygen into the bed to allow the biota to oxidize the ammonia nitrogen content of the waste water passing therethrough and thereafter removing excess bacterial growth formed on said carrier during the process.

The term "fluidized bed" as employed herein refers to the flow of a suitable liquid upwardly through a bed of suitable sized particles at a velocity sufficiently high to buoy the particles, to overcome the influence of gravity, and to impart to them an appearance of movement within the bed; said bed being expanded to a greater depth than when no flow is passing therethrough. The particles travel to different parts of the bed and are imparted with movement within the bed. On the contrary, in an expanded bed as employed in the prior art systems such as the systems mentioned hereinbefore in connection with the two Weber et al publications and the Huether, U.S. Pat. No. 3,658,697, the particles are primarily substantially suspended in a given volume by the water passing therethrough.

As waste water containing nitrogen in the form of ammonia is passed through the fluidized bed, bacterial growth on the particles is accelerated and the bed particle size increases. If unchecked, the bed particles become enlarged and may agglomerate, thus reducing the biological surface area per unit volume of the reactor and the efficiency of the column. Further, the particles tend to be reduced in specific gravity as they enlarge and/or agglomerate and tend to be carried away from the bed. It is a feature of the present process that the excess cellular material or bacterial growth formed on the particles during the process is mechanically removed thereby overcoming the tendency of the particles to be carried away in the process effluent. Accordingly, the term "excess cellular material" as employed herein refers to the excess of such material attached to the particulate carrier beyond that needed for the normal operation of the system.

Employing a fluidized bed for biological treatment also permits waste water containing substantial amounts of suspended matter to be treated. Such suspended matter readily passes through the fluidized bed. Other types of beds, such as packed beds, are subject to plugging and excess pressure losses caused by excess growth and by retention of suspended particulate matter contained in waste water.

Another substantial advantage of the present fluidized bed process is the unexpected high flow rates and removal efficiencies achieved by the fluidized system. The process is readily adapted to meet the water and waste water purification needs of municipalities and industry.

In view of the foregoing, this invention contemplates a new and improved biological process for removing ammonia nitrogen from waste water which includes the steps of forming a fluidized bed of microorganisms attached to a solid particulate carrier, continuously passing waste water to be treated through the fluidized bed, adding oxygen to the fluidized bed, and retaining the waste water in the fluidized bed for a sufficient period of time, while maintaining the fluidized bed at a sufficient temperature, and while maintaining the fluidized bed under aerobic conditions to biologically convert substantially all of the ammonia nitrogen to be removed from the waste water to oxidized forms of nitrogen, including nitrite and/or nitrate nitrogen, water, and cellular material. The process further comprises the steps of continuously withdrawing the oxidized forms of nitrogen and water from the fluidized bed, and removing excess cellular material from the particulate carrier. In another form of the invention, apparatus is provided to effect the foregoing process.

DESCRIPTION OF THE PREFERRED EMBODIMENTS

Figure 1:
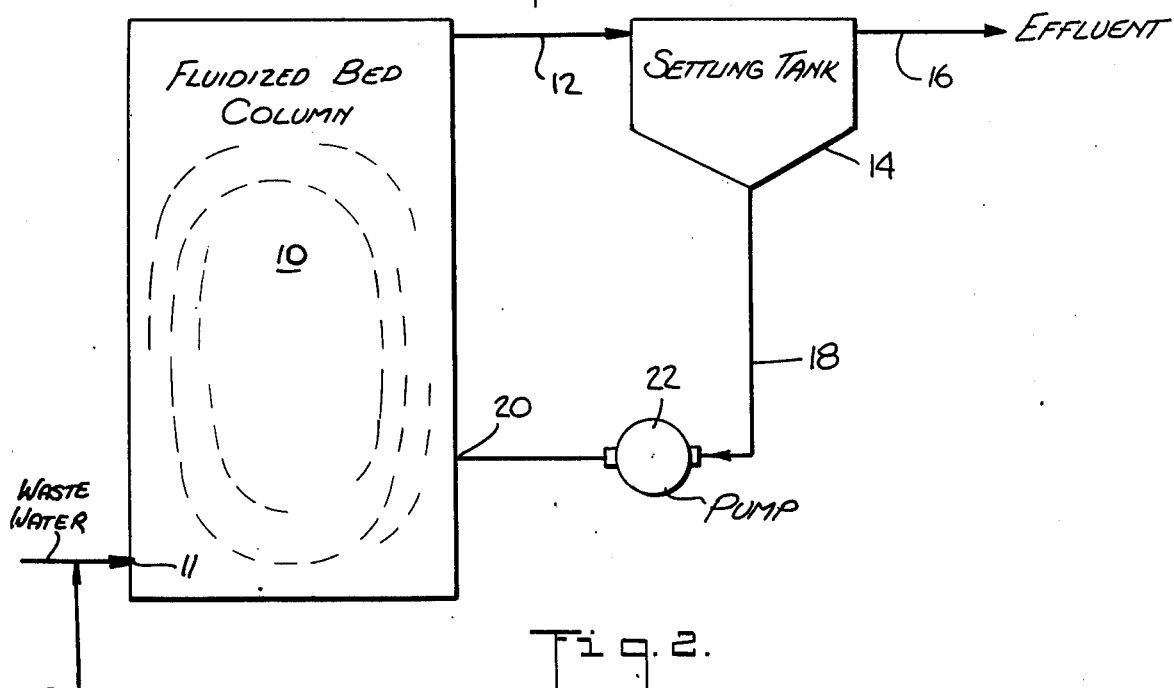
FIG. 1 is a flow sheet illustrative of the process of the invention with the various processing components shown more or less diagrammatically.

While applicable to the treatment of any fluid containing ammonia-nitrogen to which bacteria can become acclimated, the present process is most readily adapted for nitrification at secondary waste water treatment facilities. Designed for complete nitrification of waste water, the process may also be installed at overloaded conventional trickling filtration plants or activated sludge processing facilities where BOD is being removed but where nitrification becomes necessary particularly where land availability is limited. It has far-reaching capabilities to augment overloaded treatment systems.

For most practical applications, the waste water to be treated will contain at least the equivalent of about 10 milligrams per liter of ammonia nitrogen. Of course, the process is able to treat waste water containing less than this amount.

There must be sufficient oxygen in the feed waste water in order to provide the stoichiometric amount for oxidation of the ammonia to be removed. Pure oxygen or an oxygen containing gas, such as air, may be injected into the feed preferably prior to entry of the feed into the fluidized bed. If desired, the oxygen may be injected into the fluidized bed or both into the feed and bed. To increase the efficiency of the oxygen transfer, the effluent gases from the fluidized bed can be recycled into the waste water, or the waste water may be recycled to enhance greater oxygen adsorption.

By way of an example of the process, waste water is passed through the up-flow fluidized bed according to the invention in the presence of appropriate microorganisms which convert ammonia nitrogen to oxidized forms of nitrogen, including nitrite and/or nitrate nitrogen and cellular material. A general equation for the biological phenomenon may be expressed as follows:

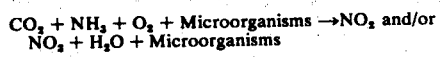

Sufficient oxygen must be present to satisfy this stoichiometric minimum in light of the amounts of ammonia present in the waste water. Generally, from about 3.0 to about 5.0 milligrams of dissolved oxygen are needed for each milligram of ammonia oxidized. Lesser amounts can be employed; however, the process generally becomes less efficient. If greater amounts are employed, then an excess of oxygen is provided which is unnecessary to the implementation of the process. In certain instances it will not be possible to accurately determine the ammonia nitrogen in the waste water. Therefore, as a practical measure it is preferable to saturate the waste water as far as practicable with dissolved oxygen. The solubility of pure oxygen is about 40 milligrams per liter at room temperature at atmospheric conditions.

In order to provide dissolved oxygen in amounts approaching the solubility of pure oxygen it has been found that a fermentor turbine can be efficiently employed. The fermentor turbine has a hollow annular shaft with blades or turbines at the base of the shaft. Waste water is passed through a tank into which the fermentor turbine is disposed. Oxygen is passed through the central orifice of the turbine and is broken up into a plurality of tiny bubbles by the spinning blades at the base of the turbine shaft. Other gas transfer devices known in the art may also be used.

A fluidized bed system is preferably generated by passing waste water through an upright column containing microorganisms attached to a particulate carrier or substrate. In general, the carriers will be seeded with bacteria from aerobic processes adapted to feed on waste water. Nitrosomonas and nitrobacter, which are naturally found in municipal waste water are particularly preferred for this purpose.

Suitable carrier materials for the biota or microorganisms include natural or artificial materials such as coal, volcanic cinders, glass or plastic beads, sand, alumina, garnet and activated carbon particles. The size of the particles chosen is a function of both specific gravity and surface area. For the most part, the carrier particles are between about 0.2 and about 3 millimeters in diameter. Employing the preferred flow rates of the present invention, enhanced results are obtained by bed particles having a diameter of from about 0.4 to about 1.5 millimeters. The above discussion assumes the presence of spherical particles, but the particles in most cases would not be spherical. Most preferably, the particles are of a uniform size. While the aforesaid bed carrier materials are illustrative of the preferred substrates, nonetheless other materials, nontoxic to the bacteria, whether natural or synthetic, can be employed.

It is apparent that substantial amounts of ammonia can be aerobically nitrified in a fraction of the bed, sometimes in the first few feet adjacent the influent feed. Accordingly, it may be sufficient to provide aerobic conditions for only a fraction of the bed height. Similar results are obtained for aerobic removal of BOD. Further, it is within the scope of the invention to carry out the process in this manner.

For enhanced ammonia removal, the bed particles preferably have a thin layer of bacteria seeded thereon. Preferably, the bed particles are first cultured with seed bacteria such as those present in sewage. Seeding is provided externally, or preferably, internally within the fluidized bed column. For this purpose the carrier particles are introduced into the column and thereafter waste water which is to be treated is fed through the column. It has been found that seeding is enhanced by recycling all of a portion of the flow, controlling the pH and concentrations of $NH_3$ and alkalinity. Seed bacteria or bacteria naturally present in the sewage rapidly grow around the bed particles and become acclimated to the system. The specific gravity of the seeded particles is preferably no less than 1.1 and preferably at least about 1.2 in order to insure that such particles are not carried out of the system during operation of the fluidized bed.

By way of an example of the operation, waste water, appropriately oxygenated if necessary, enters a vertical cylindrical column through a distribution manifold in the column base. A suitable distribution manifold has a series of spaced apart inlet ports which regulate the flow of waste water through the column. Obviously, a wide assortment of conventional distribution manifold systems could be utilized also.

The pressure of the waste water influent at the point of fluidization varies depending on many factors, including the quantity of bed particles, their specific gravity and the degree of pressurization set in the column. For the vertical column fluidized bed systems, the oxygenated feed is pumped into the column at a rate sufficient to support the seeded particles in the state of fluidization as hereinbefore described.

Where waste water contains highly concentrated wastes, microorganisms or occluded solids, it may be desirable to inject the oxygen at greater than atmospheric pressure. At increased pressures larger amounts of oxygen are dissolved in the waste water to satisfy the increased stoichiometric requirements. For example, amounts as great as about 150 milligrams of oxygen per liter of waste water and more can be supplied to the feed at super atmospheric pressure.

In general the flow rate into the column is sufficient to provide a fluidized bed according to the invention. Depending upon the size and specific gravity of the bed particles, among other factors, the flow rate is usually at least about 6 gallons per minute per square foot of bed. By adjusting the specific gravity of the bed particles, by employing denser bed particles and the like, the process can be carried out at very high flow rates, possibly even the order of hundreds of gallons per minute per square foot of bed. Commercially, it is desirable to operate at flow rates approaching 100 gallons per minute per square foot of bed. Fluidized beds operating according to the fundamental principles of the present invention have been successfully operated at flow rates of about 15 gallons per minute per square foot of bed and operations at higher rates are well within present technology as set forth herein.

It has been found that enhanced results are obtained, and accordingly, it is preferred to provide a flow rate into the column from about 6 to about 40 gallons per minute per square foot of natural or artificial bed.

Further enhanced results are obtained when the flow rate is from about 8 to about 25 gallons per minute per square foot of bed. Depending upon the specific flow rate selected, the actual dwell time within the column for a volume of waste water can be as little as from about 2 to about 5 minutes. In general, the dwell time within the column is usually under about 30 minutes and most frequently less than about 15 minutes for up to about 12 feet of bed height, but the actual dwell time is a function of the size of the reactor. The flow rate is preferably adjusted to compensate for the size and specific gravity of the seed particles.

For a given bed, as the flow rate is increased in order to increase the volume of waste water being treated, the specific bed of microorganisms attached particles will increase in height. In order to compensate for the tendency of the bed to increase in height at higher flow rates, it is desirable to employ additional bed particles or to employ bed particles of higher specific gravity.

As the waste water is pumped into the column an area immediately above the distribution manifold may be free of seeded particles although bed particles with sufficient growth may remain. This phenomenon has also been observed during initial seeding periods of the bed but disappeared as seeding of the carrier particles progressed. This interface height, then (the height from the distribution manifold to the bottom of the seeded fluidized bed in a vertical column) is a function of the flow rate of the column, the temperature, the specific gravity of the bed particles and the length of time of the seeding period as well as the nature of the distribution manifold. Practically, this phenomenon has a minimal effect, if any, on the column's efficiency. Generally as flow rate increases interface height increases and conversely as flow rate decreases interface height decreases.

In general, the pH of the fluidized system will not require external manipulation. If need be, it may be adjusted to fall within the range of from about 5.5 to 9.5. Best results are obtained at a pH from about 6.0 to 9.0. The internal temperature of the fluidized column should be sufficient to permit bacterial activity. For this purpose the bed temperature is from about 5° to about 45° C. The bed temperature will vary with that of the influent waste water and, accordingly, ambient operating temperatures on the order of from about 8° to about 30° C. will be the nominal bed temperatures and are entirely satisfactory.

As the ammonia oxidation reaction proceeds in the fluidized bed, bacteria tend to grow on the surface of the carrier particles. After a time, if unchecked, bed particles tend to form thick layers and expand to the extent that they form agglomerates, and/or gelatinous masses. Should this be permitted to occur, then the surface area per unit reactor volume available for biological reaction is greatly reduced and the efficiency of the process is correspondingly reduced. Further particles tend to be carried out of the fluidized bed as their specific gravity decreases. They also tend to entrap or become attached to gas bubbles, such as oxygen bubbles from the injected source. The gas bubbles reduce the specific gravity of the particles and tend to carry them away from the bed toward the top of the column where they can collect as an undesirable floc and/or leave the system.

In order to overcome these problems excess bacterial growth is preferably mechanically removed from the particles although chemical and biological means or combinations thereof may be employed to supplement mechanical removal. Sufficient growth in the form of a thin layer of bacteria must remain on the particles in order to preserve the efficiency of the process. Removing all growth which has been suggested in the prior art for up-flow expanded bed process used for treating waste water to remove carbon by adsorption, destroys the efficiency of the present process. In one embodiment, growth is regulated by removing predetermined quantities of bed particles from the column by a valve-controlled outlet port and mechanically agitating and abrading the particles. This operation may be performed in a separate abrasion vessel employing a mixer which resembles the rotating knife in a Waring Blender. The abraded particles are then returned to the bottom of the fluidized bed. Alternately, the particles in the abrasion vessel are subjected to the action of compressed air or water sprays to remove excess microorganisms. Other suitable agitation mechanisms and apparatus will be apparent to those skilled in the art. After treatment, the abraded particles are metered into the fluidized bed at its base by a suitable inlet port. The withdrawal of measured amount of bed particles, their cleaning and recyling into the process can be accomplished without a significant interference with the continuity of the process.

By way of example, in a second embodiment, bed particles are allowed to be carried out in the effluent from the column into a settling tank from which they are pumped into the bottom of the column. Separation of the excess cellular material growth from the particulate carrier is effected by the pump. FIG. 1 illustrates this process. Waste water and air or oxygen is introduced into a fluidized bed column 10 through an inlet port 11 for treatment therein. The treated waste water containing bed particles is exhausted as at 12 from the fluidized bed column 10 into a settling tank 14. Separation of the treated waste water or effluent 16 and bed particles 18 occurs in the settling tank. The separated bed particles are then pumped back into the fluidized bed column as indicated at 20. Separation of the growth from the carrier particles occurs by abrasion in a pump 22. When the mixture of the abraded carrier and the growth or excess cellular material is pumped back into the column 10, the carrier particles will remain in the column while the excess cellular material will be carried on through the system to the effluent 16.

By way of example, in a third and more preferred embodiment, the particles are treated in situ in order to remove excess bacterial growth from their outer surfaces. It has been found that excess bacterial growth is readily removed from floc, agglomerates and/or bed particles at the top (or downstream side) of the bed, by a sharp rotating blade or flexible agitator. These mechanisms shear the bacteria from the carrier particle and thereby remove excess growth. The stirrer provides continuous control of the height of the fluidized bed. Other mechanical mixers, ultrasonic devices, baffle plates and other abrasion-type surfaces, or even water or compressed air jets directed upwardly and sidewardly against the column walls to create agitation vortices and the like, as well as other suitable conventional agitating means, can be employed within the column.

Where the bacteria are abraded batchwise to control growth, it has been found that sufficient growth is removed, when the height of the fluidized bed after treatment is reduced on the order of from about 10 to 25 percent of its original expanded length at the same flow rate. At highly elevated or substantially reduced flow rates, the height may be somewhat above or below the aforesaid range. For removal of excess growth in situ using the air cleaning method, for example, the flow rate to the column may be reduced to about ⅓ normal flow (reduction is dependent on operating flow rate). The bed will settle to a new lower height. Air is injected into the bed to cause abrasion. During and immediately after this abrasion, the removed growth is carried out of the reactor and exhausted from the system. Thereafter, the flow rate may be increased to its normal velocity.

Depending upon the nature of the waste water and the concentration of contaminants, it may prove useful to employ more than one column connected in series. It has been found practical in many cases to employ the effluent from the first column as the influent feed for a second column. Accordingly, a plural column system may provide enhanced results for treatment of industrial, municipal and other waste waters. In a two column system, ammonia nitrogen is further oxidized by directing the effluent from the first column into the second column as the sole influent, or in combination with fresh sewage. During start-up of the column it has, in certain cases, been found useful to recycle at least a portion of the effluent treated to the column in order to promote initial growth of bacteria on the bed carrier particles in situ.

Figure 2:
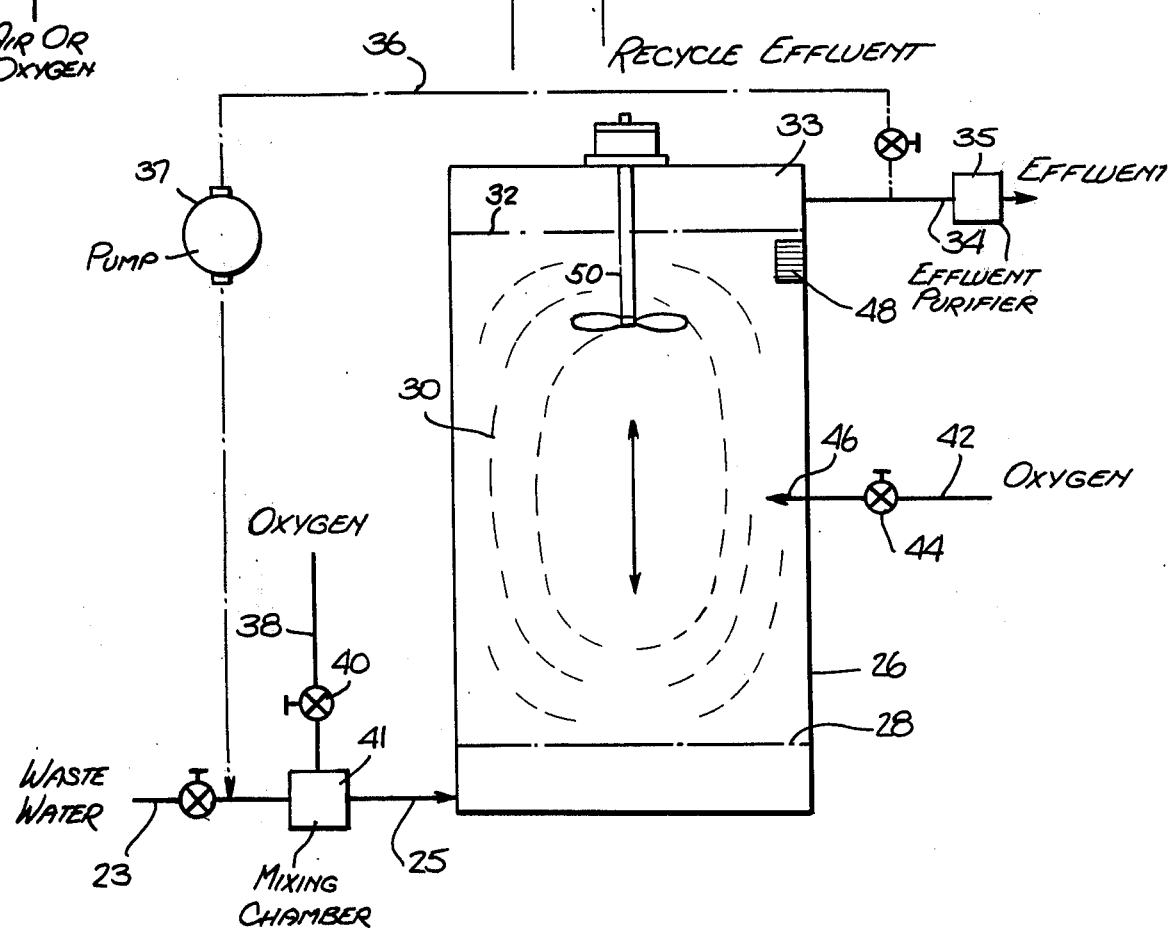
FIG. 2 is a flow sheet illustrative of the process of a second embodiment of the invention.

By way of example, FIG. 2 shows a somewhat preferred embodiment of the process according to the invention. Waste water is introduced through an inlet pipe 23, valve 24 and inlet port 25 into the lower portion of cylindrical column 26 through a manifold 28 in the base of the column. Microorganism or biota-seeded bed particles are fluidized by the passage of waste water through the column and form a fluidized bed 30. The interface height of the fluidized bed is indicated at 32, forming a chamber 33 thereabove in the column. Treated waste water or effluent is exhausted from the column after passage through the fluidized bed and chamber 33, as at 34. Then the effluent may be passed through an effluent purifier 35 such as a settling tank or for treatment with flocculants or the like, if necessary. Selected portions of the effluent, as required, are recycled through pipe line 36, containing a pump 37, to the influent waste water inlet port 25. This serves the following purposes: (1) to promote growth of the biota or microorganisms on the particles during seeding operations; (2) to maintain uniform flow where input flow decreases; (3) to dilute the concentration of ammonia into the bed, if necessary to provide uniform concentration of waste water; (4) to provide more oxygen to the waste water; (5) to permit additional removal of ammonia remaining in the effluent. Oxygen is metered through an inlet pipe 38 and valve 40 into a mixing chamber 41 and then into the waste water inlet port 25 in sufficient amounts to satisfy the biological reaction for the oxidation of the ammonia. The metering of sufficient amounts of oxygen may be conducted automatically by providing a conventional oxygenating system, such as the UNOX process of Union Carbide, Inc. In some installations, in addition to the oxygen supplied through inlet pipe 38, or as an alternative thereto, oxygen is metered through inlet pipe 42, valve 44 and inlet port 46, directly into the fluidized bed 30. In order to facilitate the dissolution of relatively large quantities of oxygen into the waste water, the system may be pressurized to several atmospheres of pressure or more. Additionally, effluent gas, if any, may be recycled. Provision can be made for metering in oxygen in response to the output of an oxygen analyzer (not shown) placed within the bed, in the effluent line or adjacent the feed, if desired.

During treatment, bacterial growth on the particles is monitored as a function of bed expansion by a conventional optical device or other type of solids sensor 48. When bed expansion reaches a predetermined height whereby the sensor device is activated, the bed particles are regenerated by abrasion or the like to remove excess growth. A mechanical stirrer assembly 50 is preferably provided at the top of the column to remove excess growth of the cellular material. The stirrer is in the form of sharp rotating blades or is formed from a flexible length of synthetic polymeric material, polyethylene tubing, as desired.

In some installations it is desirable to employ an upwardly- outwardly directed conical portion at the upper end of the fluidized bed column to reduce the upward flow velocity to prevent the bed particles from being carried off in the effluent, among other desirable features. Further, this feature serves at least as an assisting means for controlling the growth on the bed particles.

In some installations, the present process can be employed to provide the nitrified feed, or otherwise utilized in cooperation with the carbon-denitrification process of my copending application filed simultaneously herewith entitled "Waste Treatment Apparatus and Process." Further, the present process can be utilized to provide feed for the denitrification process set forth in U.S. Patent application Ser. No. 264,346 filed June 19, 1972, now U.S. Pat. No. 3,846,289, issued Nov. 5, 1974.

Further, in some installations, it is possible to employ a plurality of stages in a single fluidized bed column. The first or lowermost stage of the column is maintained in such condition as to remove BOD anaerobically the second stage in the column is maintained in such condition as to remove BOD aerobically, the third stage is maintained in such condition as to effect nitrification of the waste products; and the fourth stage is maintained in such condition as to effect denitrification of the waste products. Further, various recycle means may be employed to recycle at least a portion of the products through one or more of the stages. All or some of the foregoing stages may be employed in a single fluidized bed column. It should be recognized that it may be possible to carry out more than one of the above processes simultaneously in a single stage of a multiple system. It will also be appreciated that the foregoing sequence of stages may be varied, if desired.

EXAMPLE OF INVENTION

To demonstrate the process a number of tests were made as indicated hereinafter using a 12 foot high, by 3 inch diameter Plexiglas column. Sand of a silica composition of about 0.4 to 0.8 mm size was used upon which to grow the nitrifying organisms. The synthetic waste water was fed into the bottom of the column and taken out at the top. The synthetic waste consisted of tap water to which ammonia and bicarbonate were added as major ingredients, and phosphorus to a lesser degree. During the test period the height of the fluidized bed was about 5.5 feet, the influent flow was 1800 milliliters/min. and the temperature averaged 21° C.

truly significant in light of the long detention periods normally required with prior art processes.

The presently preferred embodiments of the invention have been described for purposes of explanation. It should be understood that modifications may be made therein as will appear evident to those skilled in the art to which the invention pertains. It is therefore, intended to encompass all such changes as fall within the true spirit of the invention.

What is claimed is:

1. A biological process for removing ammonia nitrogen from waste water, which comprises
    forming a fluidized bed of a solid particulate carrier having a cultured layer of nitrifying microorganisms seeded thereon,
    continuously passing waste water to be treated through said fluidized bed,
    adding oxygen to said fluidized bed,
    retaining said waste water in said fluidized bed for a sufficient period of time while maintaining said fluidized bed at a sufficient temperature and while maintaining said fluidized bed under aerobic conditions to biologically convert substantially all of the ammonia nitrogen to be removed from the waste water to oxidized forms of nitrogen, water and cellular material, and
    continuously withdrawing said oxidized forms of nitrogen and water from said fluidized bed, and removing excess of said cellular material from said particulate carrier.

2. A biological process for removing ammonia nitrogen from waste water, according to claim 1, wherein said step of removing excess of said cellular material from said particulate carrier is effected at the downstream portion of said fluidized bed by rotating a sharp blade or flexible stirrer.

3. A biological process for removing ammonia nitrogen from waste water according to claim 1, wherein said particulate carrier is first cultured with seed bacteria externally of said fluidized bed to form said microorganisms.

4. A biological process for removing ammonia nitrogen from waste water according to claim 1, wherein said particulate carrier is first cultured with seed bac-

| | NITRIFICATION TEST DATA | | | | | | | |
|---|---|---|---|---|---|---|---|---|
| | DISSOLVED O$_2$ | | pH | | NITRATE-N | | NITRITE-N | |
| TEST | INF. | EFF. | INF. | EFF. | INF. | EFF. | INF. | EFF. |
| 1 | 8.4 | 0.3 | 7.1 | 6.6 | 1.6 | 4.2 | 1.7 | 4.4 |
| 2 | 8.1 | 0.4 | 7.6 | 6.3 | 1.6 | 4.1 | 0.2 | 4.3 |
| 3 | 8.2 | 0.6 | 8.0 | 7.0 | 0.7 | 3.3 | 0.8 | 3.9 |
| 4 | 8.6 | 0.7 | 7.6 | 7.0 | 0.7 | 2.6 | 0.8 | 3.2 |
| 5 | 8.6 | 0.5 | 7.4 | 6.6 | 1.8 | 3.6 | 0.7 | 4.3 |
| 6 | 9.8 | 0.8 | 8.1 | 7.1 | 1.8 | 5.8 | 0.6 | 6.4 |
| 7 | 8.5 | 0.5 | 7.6 | 6.9 | 0.6 | 5.5 | 0.1 | 0.1 |
| AVERAGE | 8.7 | 0.5 | 7.6 | 6.8 | 1.3 | 4.2 | 0.7 | 3.8 |

At the flow rate of 9.7 gallons per minute per square foot, the detention time in the 5.5 foot fluidized bed was less than 5 minutes. It can readily be seen that oxygen was limiting the process as only 0.5 mg/l was left in the effluent and if pure O$_2$ had been used more ammonia could have been nitrified. Also, only half or less of the column was seeded during this test period and much greater nitrification would be expected for a fully seeded column. In effect, 6 mg/l of NO$_2$-N + NO$_3$-N were produced in this short time period which is teria internally of said fluidized bed to form said microorganisms.

5. A biological process for removing ammonia nitrogen from waste water according to claim 1, further comprising the step of continuously recycling at least a portion of said waste water through said fluidized bed.

6. A biological process for removing ammonia nitrogen from waste water according to claim 5 further comprising the step of adding oxygen to said portion being recycled.

7. A biological process for removing ammonia nitrogen from waste water according to claim 1, further comprising passing said waste water to be treated sequentially through a series of fluidized beds and biologically processing said waste water in each of the beds according to the steps of claim 1.

8. A biological process for removing ammonia nitrogen from waste water according to claim 1, wherein said waste water to be processed contains at least about 10 milligrams of ammonia nitrogen per liter and wherein the flow rate of said waste water through said fluidized bed is upwardly at least about 6 gallons per minute per square foot of fluidized bed, and wherein the dwell time of said waste water in said fluidized bed is less than about 15 minutes per up to 12 feet of bed height, and wherein said carrier has a particle diameter of from about 0.2 to about 3 millimeters and a specific gravity of at least about 1.1.

9. A biological process for removing ammonia nitrogen from waste water according to claim 1, wherein said waste water contains at least up to about 10 milligrams of ammonia nitrogen per liter and the flow rate of said waste water through said fluidized bed is upwardly between about 6 and about 40 gallons per minute per square foot of fluidized bed, and wherein the dwell time of said waste water in said fluidized bed is less than about 15 minutes per up to about 12 feet of bed height, and wherein said carrier has a particulate diameter of from about 0.4 to about 1.5 millimeters and a specific gravity of at least about 1.4 and wherein the pH value of the fluidized bed is between about 5.5 and about 9.5 and wherein the temperature of the fluidized bed is between about 5° and about 45° C.

10. A biological process for removing ammonia nitrogen from waste water according to claim 1 wherein said particulate carrier is one of a group consisting of coal, volcanic cinders, glass, plastic beads, sand, garnet, activated carbon and alumina.

11. A biological process for removing ammonia nitrogen from waste water according to claim 1 wherein said oxygen is added to the influent waste water prior to entering the fluidized bed.

12. A biological process for removing ammonia nitrogen from waste water according to claim 1 wherein said oxygen is added directly to the fluidized bed.

13. A biological process for removing ammonia nitrogen from waste water according to claim 1 wherein said oxygen is simultaneously added to the influent waste water prior to entering the fluidized bed and directly to the fluidized bed.

14. A biological process for removing ammonia nitrogen from waste water according to claim 1, wherein from about 3.0 to about 5.0 milligrams of dissolved oxygen are added for each milligram of ammonia to be removed from the waste water.

15. A biological process for removing ammonia nitrogen from waste water, which comprises
forming a fluidized bed of a solid particulate carrier having a cultured layer of nitrifying microorganisms seeded thereon,
continuously passing waste water to be treated through said fluidized bed,
adding oxygen to said fluidized bed,
retaining said waste water in said fluidized bed for a sufficient period of time while maintaining said fluidized bed at a sufficient temperature and while maintaining said fluidized bed under aerobic conditions to biologically convert substantially all of the ammonia nitrogen to be removed from the waste water to oxidized forms of nitrogen, water and cellular material,
continuously withdrawing said oxidized forms of nitrogen and water from said fluidized bed, and
withdrawing from said fluidized bed so said processed waste water together with at least some particulate carrier having excess cellular material thereon and passing same to a settling tank,
retaining said so processed waste water together with said particulate carrier having excess cellular material thereon in said settling tank for a sufficient period of time to allow said particulate carrier having excess cellular material thereon to settle to the bottom of the tank,
withdrawing said so processed waste water from the top of said settling tank,
withdrawing said particulate carrier having excess cellular material thereon from the bottom of the settling tank and passing it through pumping means to effect separation of the excess cellular material from the particulate carrier, and
passing the mixture of paticulate carrier and excess cellular material back into the fluidized bed to mix the so separated excess cellular material with the waste water to be treated.

16. Apparatus for biologically removing ammonia nitrogen from waste water, the combination comprising an elongated, substantially vertically disposed container, a manifold disposed towards the bottom of said container, inlet means for said manifold for receiving waste water to be processed, a fluidized bed of a solid particulate carrier having a cultured layer of nitrifying microorganisms seeded thereon, said bed being disposed in said container above said manifold, means for adding oxygen to said fluidized bed, said fluidized bed being arranged to receive said waste water from said manifold and biologically convert substantially all of the ammonia nitrogen to be removed from the waste water to oxidized forms of nitrogen, water and cellular material, outlet means for said container for continuously withdrawing the so processed waste water, oxidized forms of nitrogen, and means for removing excess cellular material from said particulate carrier.

17. Apparatus for biologically removing ammonia nitrogen from waste water according to claim 16 wherein said means for removing excess cellular material from said particulate carrier is a mechanical stirrer mounted on said container to extend into the upper portion of said fluidized bed.

18. Apparatus for biologically removing ammonia nitrogen from waste water according to claim 16 further comprising a solids sensor means for actuating said means for removing excess cellular material from said particulate carrier when said fluidized bed exceeds a predetermined height.

19. Apparatus for biologically removing ammonia nitrogen from waste water according to claim 16 further comprising means for interconnecting said inlet means for said manifold with said outlet means for said container in fluid flow communication, and valve means for controlling the flow in said means for interconnecting and pump means for recycling treated waste water through said interconnecting means.

20. Apparatus for biologically removing ammonia nitrogen according to claim 16 wherein said particulate carrier is one of a group consisting of coal, volcanic cinders, glass, plastic beads, garnet, activated carbon and alumina.

21. Apparatus for biologically removing ammonia nitrogen from waste water according to claim 16 wherein said means for adding oxygen to said fluidized bed includes piping means for directly adding oxygen to said fluidized bed.

22. Apparatus for biologically removing ammonia nitrogen from waste water, the combination comprising an elongated substantially vertically disposed container having a lower inlet for receiving waste water to be processed, a fluidized bed of a solid particulate carrier having a cultured layer of nitrifying microorganisms seeded thereon, said bed being disposed in said container, means for adding oxygen to said fluidized bed, said bed being arranged to receive said waste water from said inlet and biologically convert substantially all of the ammonia nitrogen to be removed from the waste water to oxidized forms of nitrogen, water and cellular material, outlet means for said fluidized bed for withdrawing the so processed waste water, oxidized forms of nitrogen, and at least some particulate carrier having excess cellular material thereon, a settling tank disposed in fluid flow relationship with said outlet means for receiving said so processed waste water and said particulate carrier having excess cellular material thereon, outlet means towards the top of said settling tank for said so processed waste water, outlet means toward the bottom of said settling tank for said particulate carrier having excess cellular material thereon, pumping means disposed in fluid flow communication with said outlet means toward the bottom of said settling tank to effect separation of excess cellular material from the particulate carrier and fluid flow communication means interposed between said pumping means and the lower portion of said container for passing the mixture of particulate carrier and excess cellular material back into the fluidized bed to mix the so separated excess cellular material with the waste water to be treated.

23. Apparatus for biologically removing ammonia nitrogen from waste water, the combination comprising an elongated substantially vertically disposed container, a manifold disposed toward the bottom of said container, inlet means for said manifold, a first inlet pipe interconnecting a source of waste water to said inlet means, valve means in said first inlet pipe for controlling the flow therein, a second inlet pipe interconnecting a source of oxygen to said inlet means, said inlet means including a mixing chamber, valve means in said second inlet pipe for controlling the flow therein, a fluidized bed of a solid particulate carrier having a cultured layer of nitrifying microorganisms seeded thereon, said bed being disposed in said container above said manifold to receive a mixture of said waste water and oxygen from said manifold and biologically convert substantially all of the ammonia nitrogen to be removed from said mixture to oxidized forms of nitrogen, water, and cellular material, and outlet means for said container towards the upper end thereof for continuously withdrawing the so processed waste water, oxidized forms of nitrogen, and means for removing excess cellular material from said particulate carrier.

* * * * *

UNITED STATES PATENT OFFICE
CERTIFICATE OF CORRECTION

Patent No. 4,009,099          Dated February 22, 1977

Inventor(s) John S. Jeris

It is certified that error appears in the above-identified patent and that said Letters Patent are hereby corrected as shown below:

Column 7, line 40, "15" should read -- 25 --.

Signed and Sealed this

Third Day of May 1977

[SEAL]

Attest:

RUTH C. MASON
*Attesting Officer*

C. MARSHALL DANN
*Commissioner of Patents and Trademarks*